Jan. 29, 1935. E. C. LYONS 1,989,143
ASSEMBLER MECHANISM FOR TYPESETTING MACHINES
Filed Oct. 3, 1931
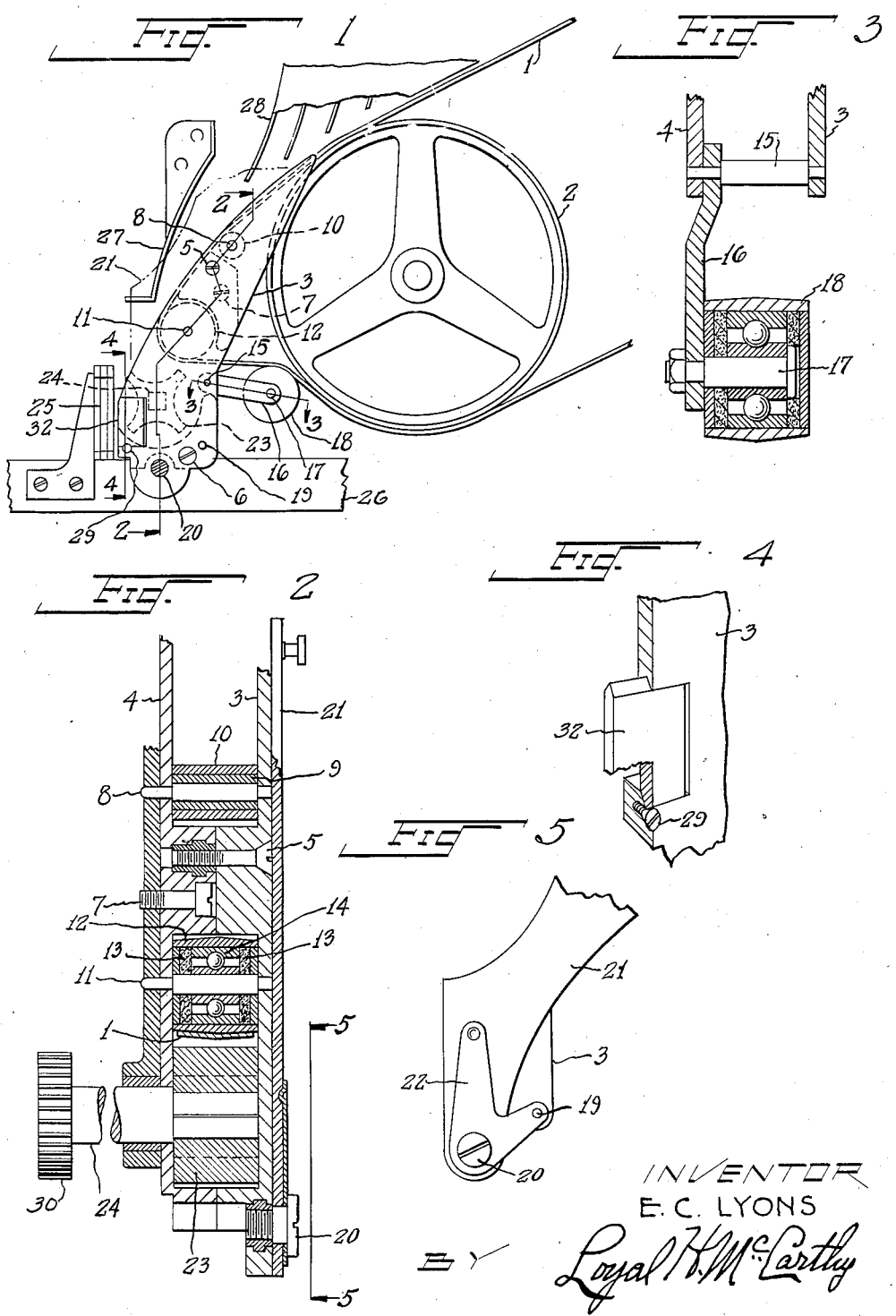
INVENTOR
E. C. LYONS
BY Loyal H. McCarthy
ATTORNEY Patented Jan. 29, 1935

1,989,143

UNITED STATES PATENT OFFICE 1,989,143

ASSEMBLER MECHANISM FOR TYPESETTING MACHINES

Ellis C. Lyons, Multnomah County, Oreg.

Application October 3, 1931, Serial No. 566,602

2 Claims. (Cl. 199—27)

My invention relates to an improvement in assembler mechanism for type setting machines wherein the matrix delivery belt delivers the matrices directly to the star wheel and is particularly adapted for use in connection with machines used commercially for the casting of type, borders and dashes.

In the mechanism usually employed the matrix belt does not extend beyond the drive wheel in the direction of the star wheel and assembler slide. In this type of mechanism the matrices are sheared off of the matrix belt by spring rails or a shearing piece and travel from this point to the star wheel by gravity and inertia. Where gravity and inertia are relied upon to thus carry the matrices to the star wheel and assembler slide there is a tendency for the thin matrices to catch upon the spring rails or shearing piece and thereby have their movement so retarded as to permit a thicker matrix thereafter released to pass the thin matrix and cause a transposition of letters.

I am aware of the fact that assembler mechanisms have been designed wherein two belts are used. In using the two belts the inside belt is in contact with the driving wheel in the usual position while the outside belt which serves as a matrix delivery belt extends beyond the drive wheel to a point in proximity to the star wheel where it passes over a small pulley so placed as to maintain the matrix delivery belt in its proper relative position.

Where two belts are used the thickness of the belts so restricts the space between the matrix delivery belt and the flexible partitions or shearing piece, on the ordinary machine, as to interfere with the proper turning of the thick matrices upon the matrix belt for delivery to the star wheel. Where the two belts are used it is also found difficult to so regulate the driving force of the matrix belt as to deliver the matrices without danger of having the force so strong as to damage the matrices as they are driven down to the star wheel and the assembler slide.

In my improved assembler mechanism I have so arranged a pulley in proximity to the star wheel and an idler pulley between said last mentioned pulley and the drive wheel as to procure sufficient frictional contact between the belt and the drive wheel to obtain the necessary driving power on the matrix belt without the use of an additional belt. At a point intermediate the assembler pulley and the upper portion of the drive wheel I have so placed a roller as to maintain the matrix belt in its proper position for delivery of matrices to the star wheel and at the same time avoid undue friction of the belt upon guiding surfaces.

One of the objects of my invention is to provide a mechanism for assembling the matrices in a rapid, uniform manner without transposition, without injury to the matrices, and with but a single free running matrix delivery belt.

Another object of my invention is to provide an adjustable slide or plate in the assembler rails so that wear on the rails can be readily compensated by moving the adjustable slides.

Another object of my invention is to provide a non-metallic assembler rail so that the matrices are not subject to wear from contact with metal rails and to provide a design which permits the removal of the front rail portion without detaching or disturbing the back rail portion.

The lower and front portion of assembler rails in proximity to the star wheel and assembling elevator are subject to wear by the constant frictional contact with the matrices. In my improved assembler mechanism I have overcome this defect by providing a dovetailed slide in each of these rails at the point of wear. These slides are held in proper position by a set-screw and may be readily adjusted and moved forward such distances as may be required from time to time to take up the wear.

In my improved assembler mechanism the rails are so designed as to permit the removal of the front half rail without detaching the back half rail from the machine. This design is desirable in that it permits the removal of the front rail and the replacement of the star wheel which is subject to constant wear and to permit the changing of the matrix belts, pulleys and other wearing parts without detaching the assembler mechanism from the machine.

In the drawing:

Fig. 1 is a side elevation of my assembler mechanism on a machine in working position, showing the assembler rails, rollers, pulleys and matrix delivery belt.

Fig. 2 is a plan view in section, taken on line (2—2) of Fig. 1, showing the position of the rollers, pulleys, rails, screws, shaft and star wheel.

Fig. 3 is a sectional view of the idler assembly, taken on line (3—3) of Fig. 1.

Fig. 4 is a sectional view of the adjustable slide or plate in the assembler rail, taken on line (4—4) of Fig. 1.

Fig. 5 is a front view of the assembler cover which pivots on a shouldered screw and is located in position by a spring clamp.

Like references refer to like parts throughout the drawing.

In the drawing:

1 is the matrix delivery belt shown in normal position, which carries the matrices to the star wheel 23.

2 is a driving pulley.

3 and 4 represent the front and back assembler rails.

5 and 6 are screws which hold the front rail in place and 7 is a screw which passes through the back rail of the assembler and fastens the assembler to the type setting machine.

8 is a dowel pin, locating assembler rails and which also carries rollers 9 and 10. Roller 9 is composition and roller 10 is metal. Roller 9 turns freely on the pin 8, and roller, 10 turns freely on the outer surface of roller 9.

11 is a dowel pin shaft which carries the ball bearing brass assembler pulley, 12. This pulley contains the felts 13, and the ball bearings 14.

15 is an idler bracket shaft pin disposed between rails 3 and 4, which carries the idler bracket 16. Attached to the idler bracket 16 is the bearing pin 17, which carries the idler ball bearing assembly 18.

19 is a clamp spring locating pin which holds clamp spring 22 in position.

20 is a shouldered screw holding assembler cover 21 in position with clamp spring 22.

23 is a star wheel located on the star wheel shaft 24, and 25 represents matrices assembled in assembler slide, 26.

27 is a chute spring for guiding matrices into assembler slide, 26.

28 represents front partitions which keep matrices 25, in their relative positions as they are released to the matrix belt for delivery to the star wheel and assembler slide.

29 is a flat-headed screw which locks the adjustable slide in the rail, 3. A like means is employed for locking a like adjustable slide in the rail, 4.

30 is a star wheel drive gear located upon the same shaft, 24, which carries the star wheel. The star wheel drive gear connects to a gear train for driving the star wheel, 23.

31 represents a section of the front of the machine into which the assembler mechanism is located.

Various departures may be made from the details of my construction without departing from the principles of my invention.

I claim:

1. In an assembler mechanism for a type setting machine assembler rails provided with adjustable slide pieces for taking up wear on assembler rails at point of contact with matrices.

2. In an assembler mechanism for a type setting machine, sectional front and rear rails, held together by means adapted to permit the removal of the front rail portion for the replacement or repair of the matrix belt, the star wheel, and other wearing parts without detaching the rear rail portion or changing from its operating position any element of the assembler mechanism that is not desired to remove, adapted to be held in place on the type-setting machine by the same means employed to hold standard assembler rails, an assembler pulley for the matrix delivery belt supported between the assembler rails in close proximity to but having an axis independent of the axis of the star wheel, and an idler pulley intermediate the assembler pulley and the drive wheel supported by the assembler rails.

ELLIS C. LYONS.